(12) United States Patent
Strömberg et al.

(10) Patent No.: US 7,355,533 B2
(45) Date of Patent: Apr. 8, 2008

(54) METHOD FOR COMPRESSION OF DATA

(75) Inventors: Jan-Olov Strömberg, Täby (SE); Öyvind Björkás, Bodö (NO)

(73) Assignee: Jan-Olov Strombert, Taby (SE)

( * ) Notice: Subject to any disclaimer, the term of this patent is extended or adjusted under 35 U.S.C. 154(b) by 7 days.

(21) Appl. No.: 10/560,056

(22) PCT Filed: Jun. 2, 2004

(86) PCT No.: PCT/SE2004/000847

§ 371 (c)(1), (2), (4) Date: Apr. 7, 2006

(87) PCT Pub. No.: WO2004/110070

PCT Pub. Date: Dec. 16, 2004

(65) Prior Publication Data
US 2006/0220934 A1   Oct. 5, 2006

(30) Foreign Application Priority Data
Jun. 10, 2003   (CH) .................................... 0301664

(51) Int. Cl.
*H03M 7/30* (2006.01)
(52) U.S. Cl. ......................................... 341/87; 341/50
(58) Field of Classification Search ........... 341/50–110
See application file for complete search history.

(56) References Cited

U.S. PATENT DOCUMENTS 6,888,891 B2 *  5/2005  Lee et al. .............. 375/240.19

7,190,289 B2 *  3/2007  Kobayashi et al. ......... 341/107

FOREIGN PATENT DOCUMENTS

| EP | 0399487 A2 | 11/1990 |
| EP | 0888013 A2 | 12/1998 |
| EP | 0921685 A1 | 6/1999 |

OTHER PUBLICATIONS

LeGall, "MPEG: A Video Compression Standard for Multimedia Applications", Apr. 1991, pp. 46-58 (Cited in Specification).
Meyer et al., "Fast Adaptive Wavelet Packet Image Compression", 2000, pp. 792-800 (Cited in Specification).
Averbuch et al., "Low Bit-Rate Efficient Compression for Seismic Data", 2001, pp. 1801-1814 (Cited in Specification).

* cited by examiner

*Primary Examiner*—Lam T. Mai
(74) *Attorney, Agent, or Firm*—Pearne & Gordon LLP

(57) ABSTRACT

A method for compressing data, for example, seismic data, audio data, or video data, comprising the steps of transforming data of a frame into a first sequence of real numbers by using an entropy increasing transform method; quantizing said first sequence of real numbers of said frame to obtain a first sequence of integers; quantizing said first sequence of integers of said frame using a predicted sequence of integers representing said first sequence of integers to produce a second sequence of integers; and encoding said integers of said second sequence of said frame into a stream of bits representing the compressed sequence of integers of said frame. Furthermore, the method comprises decompressing said compressed sequence by inverting the steps of transforming, quantizing said first sequence of real numbers, quantizing said first sequence of integers of said frame, and decoding in reverse order.

17 Claims, 6 Drawing Sheets

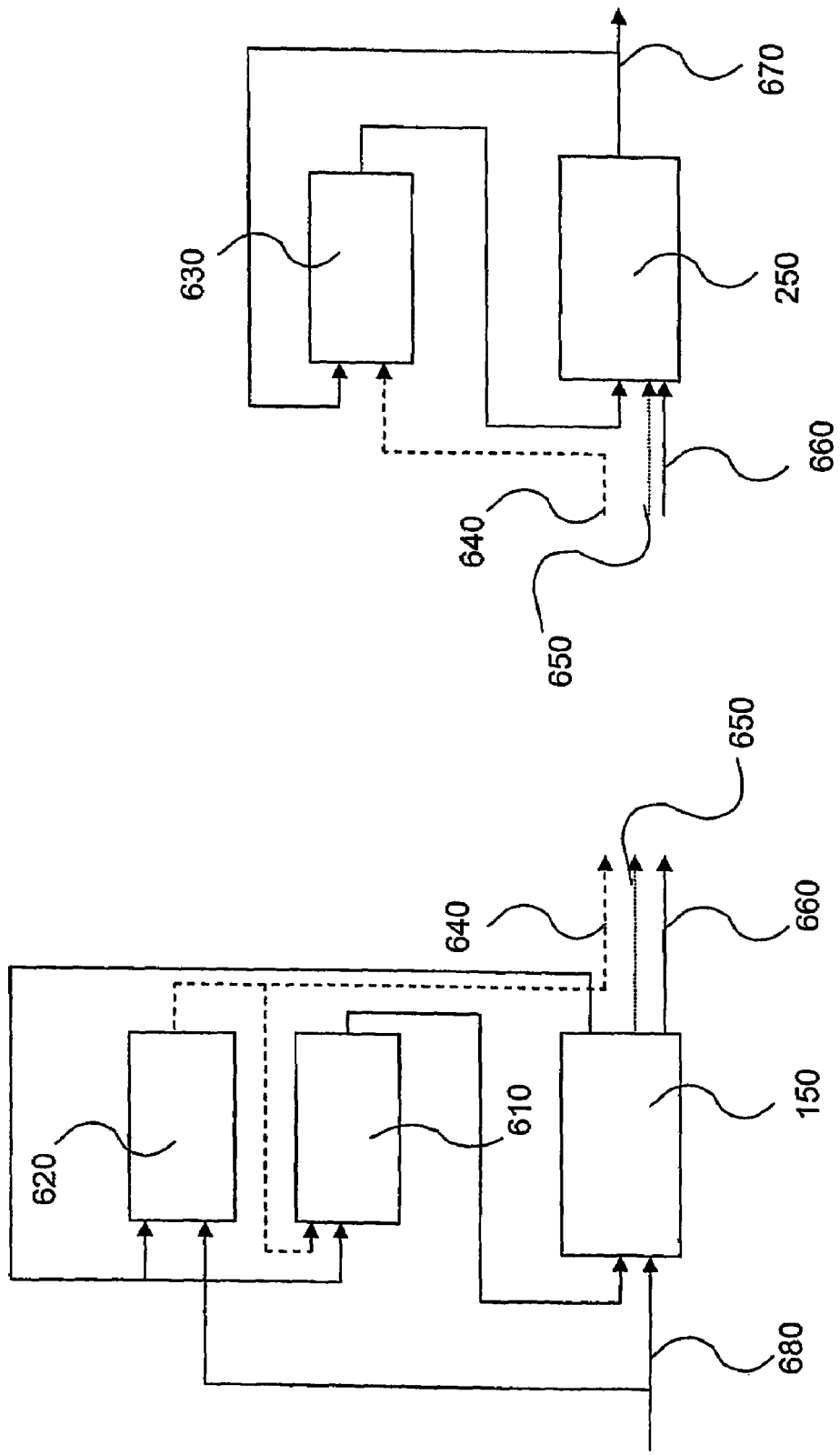

METHOD FOR COMPRESSION OF DATA

This application claims the benefit of International Application Number PCT/SE2004/000847, which was published in English on Dec. 16, 2004.

TECHNICAL AREA

The present invention relates generally to data compression methods at transmission in communication networks and in particular to an improved method for compressing and decompressing data. The invention further relates to a computer readable medium comprising instruction for bringing a computer to perform such a method.

BACKGROUND OF THE INVENTION

Data compression and decompression are well techniques for reducing either the bandwidth or the amount of memory needed to respectively carry or store data, for example video data, i.e. television-type signals, seismic data or sound or audio data. Compression typically eliminates unnecessary information content from the signal. Well known methods of video compression include for instance colour cell compression (CCC), joint photographics expert group (JPEG) compression and block truncation coding (BTC) compression. At the present, video data transmission and, in particular, live video data transmission via wireless communication networks, such as GSM, GPRS and UMTS, and via broadband is an area of tremendous interest both among users and manufacturers of networks and communication devices, such as computer systems or mobile phones, as well as among providers of network services. Due to, inter alia, bandwidth limitations and/or to too low capacity of the networks, especially the wireless networks, and since video information involves a large amount of data per video image or frame, the quality and/or the transmission rate of the video data is often inferred, which results in an inferior image quality at the receiving device. This implies in particular at the transmission of live video data, for example, at surveillance applications. Furthermore, it is frequently desirable in a computer system to store information, e.g. video data, audio data, or seismic data, in a computer memory or a disk drive and thereby compression is also of a high importance in this context to reduce the required amount of memory. Thus there is a need for compression methods which provide compression additional over that of the prior art which allow an adequate reproducing of transferred information, in particular, video information and live video information.

SHORT DESCRIPTION OF THE INVENTION

An object of the present invention is to provide an improved method for compression of data and decompression of data in a communication system These and other objects are achieved according to the present invention by providing methods and chargers having the features defined in the independent claims. Preferred embodiments are defined in the dependent claims.

According to a first aspect of the present invention, there is provided a method for compressing data, comprising the steps of: transforming data of a frame into a first sequence of real numbers by using an entropy increasing transform method; quantizing said first sequence of real numbers of said frame to obtain a first sequence of integers; quantizing said first sequence of integers of said frame using a predicted sequence of integers representing said first sequence of integers to produce a second sequence of integers; and encoding said integers of said second sequence of said frame into a stream of bits representing the compressed sequence of integers of said frame.

According to a second aspect of the present invention, there is provided a system for compressing and decompressing data, comprising: a storage device for storing data; transform means arranged to transform a frame of data into a sequence of real numbers; compression processing means, comprising quantization means arranged to quantize said first sequence of real numbers to produce a second sequence of integers; adaptive quantization means arranged to quantize said first sequence of integers to produce a second sequence of integers by using a predicted sequence of integers representing said first sequence of integers; and encoding means arranged to encode said integers of said second sequence of said frame into a stream of bits representing the compressed sequence of integers of said frame.

According to a third aspect of the present invention, there is provided a computer readable medium comprising instructions for bringing a computer to perform a method according to the first or second aspect.

The present invention is based on the insight of using the correlation of consecutive images or frames of data, for example, seismic data or video information. In other words, the present invention utilizes the fact that only when there is activity in the data stream, i.e. a change of the data between two consecutive frames, it is necessary to update the data. In the case of video data, a change may correspond to a motion of an object monitored and in the case of seismic data a change corresponds to seismic activity in the area monitored. When there is no change of data between two consecutive frames, all pixels of the two frames will substantially correspond and, consequently, no updating of the transferred data is required. Accordingly, the compression is adjusted to the amount of activity in the frames. In other words, the compression is dynamic. When the amount of activity is very low, i.e. the consecutive frames are more or less identical, the data transfer will be low, and as the amount of activity, for example seismic activity in seismic data or motion activity in video data, increases, an increased amount of data is transferred.

Consequently, the method according to the present invention is particularly useful in application where movements occur only in minor parts of the image or scene captured by the recording unit and the background of the major part of the image is stationary. Such conditions exist in, for instance, surveillance applications, video meetings, news broadcasts, interviews, or recordings utilizing a hand-held mobile camera having an in-built stabilisation unit or the like.

In addition, the method according to the present invention can be employed in other applications such as, for example, at compression of seismic data or compression of sound or audio data. In fact, the method according to the invention is useful in all applications where data characterized by a large amount of correlation occur.

As realized by the person skilled in the art, the methods of the present invention, as well as preferred embodiments thereof, are suitable to realize as a computer program or a computer readable medium, preferably within the contents of a.

These and other advantages with, and aspects of, the present invention will become apparent from the following detailed description and from the accompanying drawings.

SHORT DESCRIPTION OF THE DRAWINGS

In the following description of an embodiment of the invention, reference will be made to the accompanying drawings of which:

FIGS. 6a and 6b shows schematically an alternative embodiment according to the present invention including motion prediction blocks.

DETAILED DESCRIPTION OF THE INVENTION

Figure 1:
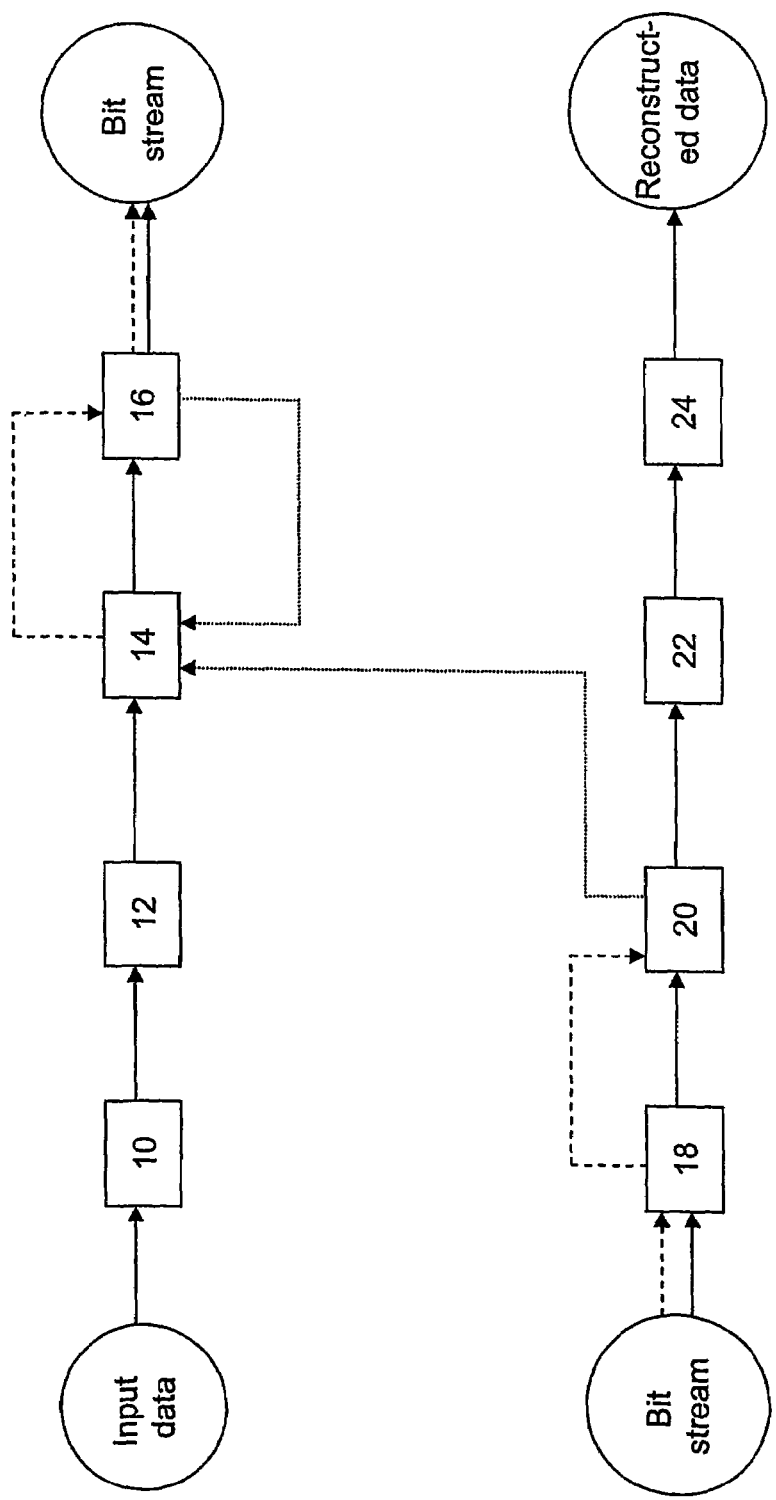
FIG. 1 shows schematically the data flow in the method for compressing and decompressing data in accordance with the present invention.

In the following there will be discussed preferred embodiments of the method for compressing video data according to the present invention. Referring now to the drawings, wherein like reference characters designate like or corresponding parts throughout the several views. As mentioned above, the method according to the present invention is particularly useful in application where movements occur only in minor parts of the image or scene captured by the recording unit and the background of the major part of the image is stationary. Such conditions exist in, for instance, surveillance applications, video meetings, news broadcasts, interviews, or recordings utilizing a hand-held mobile camera having an in-built stabilisation unit or the like. In addition, the method according to the present invention can be employed in applications other than video compression, for example, at compression of seismic data or compression of sound or audio data. In fact, the method according to the invention is useful in all applications where data characterized by a large amount of correlation occur.

Referring first to FIG. 1, the data flow in the method for compressing and decompressing data in accordance with the present invention will be shown schematically. Unbroken lines represent actual flows of application data, i.e. the data which is to be compressed, broken lines represent flows of control data, and dotted lines represent virtual data flows.

First, input data, for instance bit map data, having a high degree of correlation are transformed 10 to a first set of coefficients, preferably floats. Thereafter, the first set is quantized 12 to a second set of coefficients, preferably integers, using pre-selected static input parameters, as will be discussed below. The second set of coefficients is adaptively quantized 14 to obtain a third set of coefficients using dynamic parameters and information regarding a predicted set of coefficients, which may be the corresponding integers of sequence of the previous data set or a simulated reconstructed sequence of integers of the previous set, as will be explained in more detail below. Furthermore, control data are associated with the adaptively quantized data. Subsequently, the third set of coefficients is encoded 16 to a bit stream representing the bit map data. At the decompressing, the bit stream representing the compressed set of bit map data is decoded 18. Then, the decoded data set is processed by inverting the steps of adaptively quantizing 20, quantizing 22, and transforming 24 using the control data, the pre-selected static parameters and the dynamic parameters, thereby obtaining a reconstructed set of bit map data.

Figure 2:
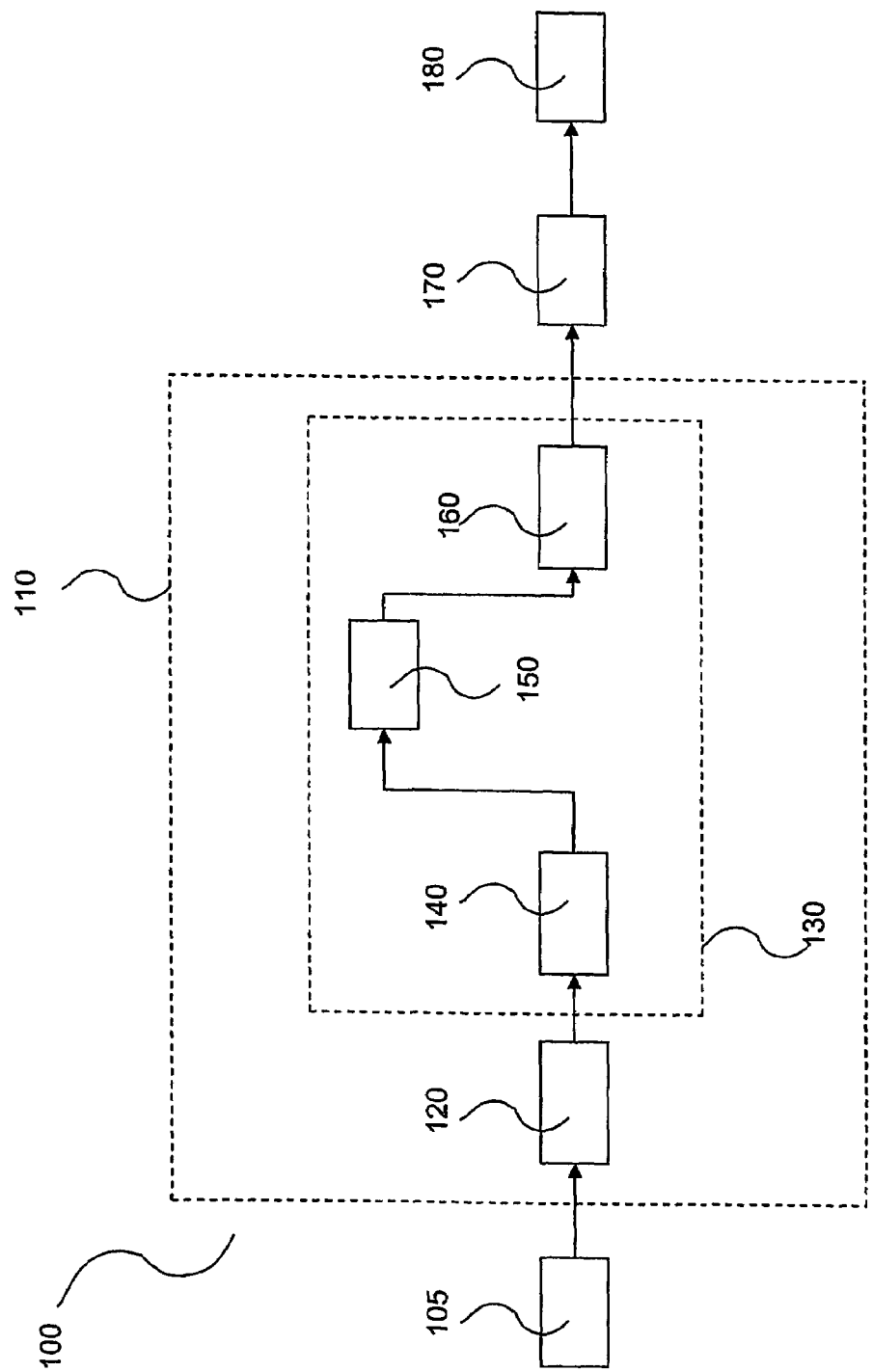
FIG. 2 shows schematically an embodiment of a compression part of a video data compression system according to the present invention.
Figure 3:
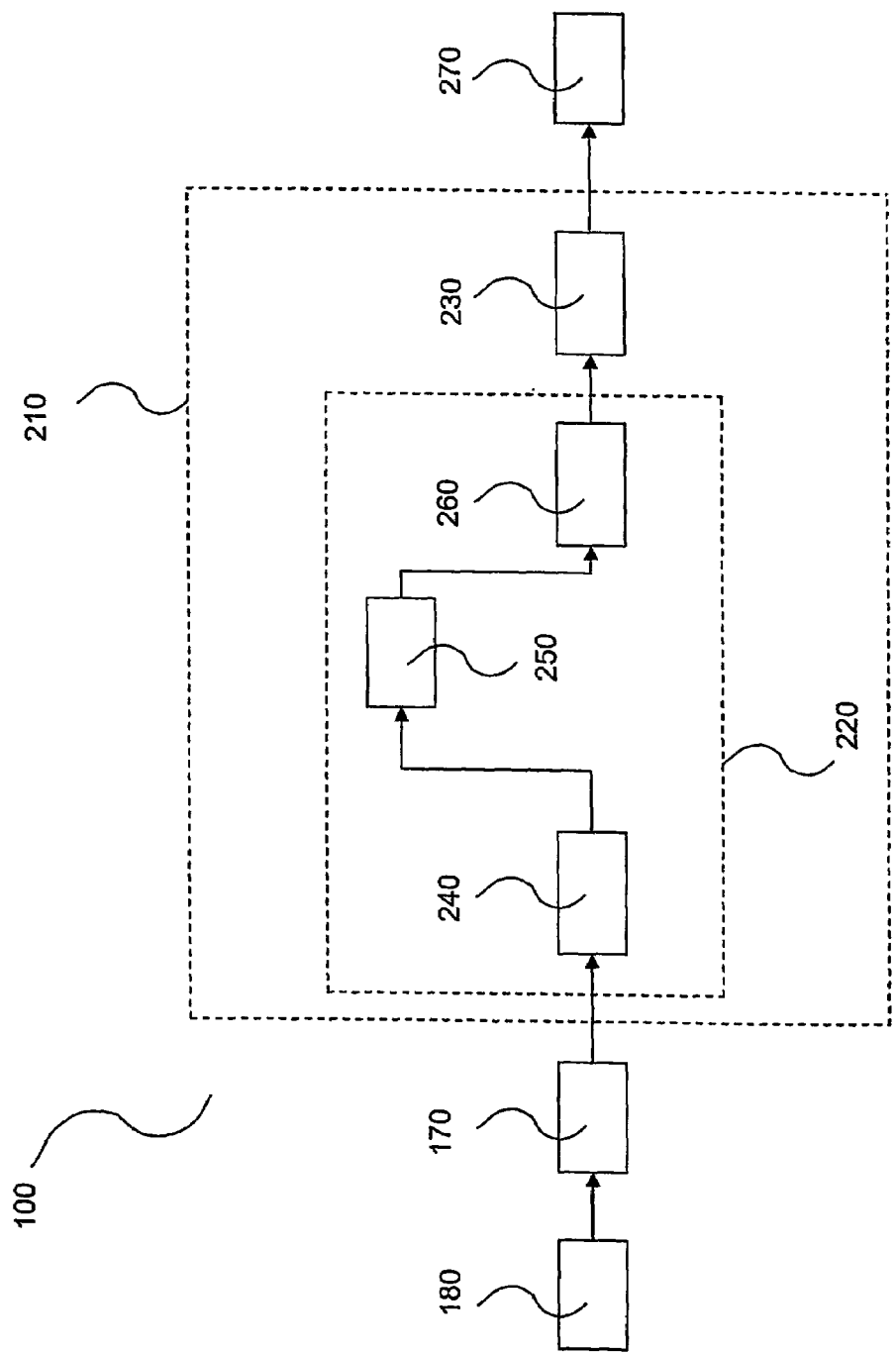
FIG. 3 shows schematically an embodiment of a decompression part of the video data system of FIG. 2.

Turning now to FIGS. 2 and 3, a data compression and decompression system according to an embodiment of the present invention will be shown. This system is adapted for use in video data applications. In the system, a digital video recorder 105 is connected through an image format converter (not shown) to a computer unit 100 having a large capacity storage device such as a hard disk. The computer unit 100 has a compression block 110 which includes a transform block 120 and a compression processing block 130. Furthermore, the compression processing block 130 comprises an quantization block 140, an adaptive quantization block 150, and a coding block 160. The compression processing block 130 is connected to a communication unit 170, for example, an operating system modem or a cellular phone, which, in turn, is connected to a communication network 180. The communication network 180 can be a wireless communication system such as the GSM, the UMTS, or the GPRS, an optical network, or a wire network.

Moreover, with reference now to FIG. 3, the computer unit 100 comprises a decompression block 210 connected to the network 180 via the communication unit 170 and including a reconstruction or decompression block 220 and an inverse transform block 230. The reconstruction block 220, in turn, includes a decoding block 240, an inverse adaptive quantization block 250, and an inverse quantization block 260. A display unit 270 for displaying video data is arranged at the computer unit 100. Furthermore, a data converter (not shown) is arranged between the inverse quantization block 260 and the display unit 270 for converting data from the block 260 into a format that can be displayed on the display unit 270.

In the video data compression and decompression system shown in FIGS. 2 and 3, digital video data of a frame or image are recorded by the digital video recorder 100. The image format converter converts the received video data to bit map data. Then, the data stream is transferred to the wavelet transform block 120 where the data stream, i.e. the bit map data, is transformed to a sequence of real numbers using an entropy increasing transform method, for example, a wavelet transform. For the sake of clarity, we assume that one sequence of data corresponds to one frame or one image. Alternatively, the data stream can be stored in the storage of the computer unit 100.

Then, the sequence of integers of each frame is feed to the quantization block 140, where the sequence is quantized using a threshold value according to known methods. Thereby, a sequence of integers is obtained. The functions and realization of the transform block and the quantization block are well known to a person skilled in the art, and therefore they will not be explained here further, see, for example, "Fast adaptive wavelet packet image compression", IEEE Transactions on image processing, 9, pp 792-800, Meyer, Francois G., Averbuch, Amir Z., and Jan-Olof Strömberg, "A video compression standard for multimedia applications", Communications of the ACm, 34 (1991('), pp 46-58, Le Gall, Didier or "Low bite-rate efficient compression for seismic data", IEEE Transactions on image processing, 10 (2001), Meyer, Francois G., Averbuch, Amir Z., Jan-Olof Strömberg, Cofman R., and Vassiliou, A.

Subsequently, the sequence of integers a feed to the adaptive quantization block 150 where the sequence is processed using an adaptive quantization and a resulting sequence of integers is obtained for each frame. The function of this block will be explained in detail in connection to FIG. 4. The output from the adaptive quantization block 150 is transferred to the coding block 160, where the resulting sequence or difference sequence of each frame is coded, using, for example, a run-length coding, and a bit stream, representing the compressed sequence of the frame, which can be transmitted to a receiving device via a network is obtained. The function and realization of the coding block is well known to a person skilled in the art, and therefore it will not be explained here further, see, for example, "Fast adaptive wavelet packet image compression", IEEE Transactions on image processing, 9, pp 792-800, Meyer, Francois G., Averbuch, Amir Z., and Jan-Olof Strömberg, "A video compression standard for multimedia applications", Communications of the ACM, 34 (1991), pp 46-58, Le Gall, Didier or "Low bite-rate efficient compression for seismic data", IEEE Transactions on image processing, 10 (2001), Meyer, Francois G., Averbuch, Amir Z., Jan-Olof Strömberg, Cofman R., and Vassiliou, A.

Next, the bit stream of each frame can be transferred to the communication unit 170 for subsequent transfer via the communication network 180 to a receiving unit, which can be a computer unit as the above-mentioned computer unit 110 or it can be stored in the storage of the computer unit 100 as a compressed representation of the sequence of the frame.

In a similar manner, but however in a reversed order, a bit stream representing a compressed sequence of integer of a frame can be decompressed. At receipt of a bit stream representing a compressed sequence of integer of a frame of video data, which sequence has been transferred via the communication network 180 or has been retrieved from the storage of the computer unit 100 for subsequent decompression, the bit stream is feed to the decoding block 240 of the reconstruction block 220. In the decoding block 240, the bit stream of each frame is decoded using a decoding method corresponding to the inverse of the coding method of the coding block and a sequence of integers corresponding to the resulting sequence is obtained. The function and realization of the decoding block is well known to a person skilled in the art, and therefore it will not be explained here further, see, for example, "Fast adaptive wavelet packet image compression", IEEE Transactions on image processing, 9, pp 792-800, Meyer, Francois G., Averbuch, Amir Z., and Jan-Olof Strömberg, "A video compression standard for multimedia applications", Communications of the ACm, 34 (1991('), pp 46-58, Le Gall, Didier or "Low bite-rate efficient compression for seismic data", IEEE Transactions on image processing, 10 (2001), Meyer, Francois G., Averbuch, Amir Z., Jan-Olof Strömberg, Cofman R., and Vassiliou, A.

Figure 5:
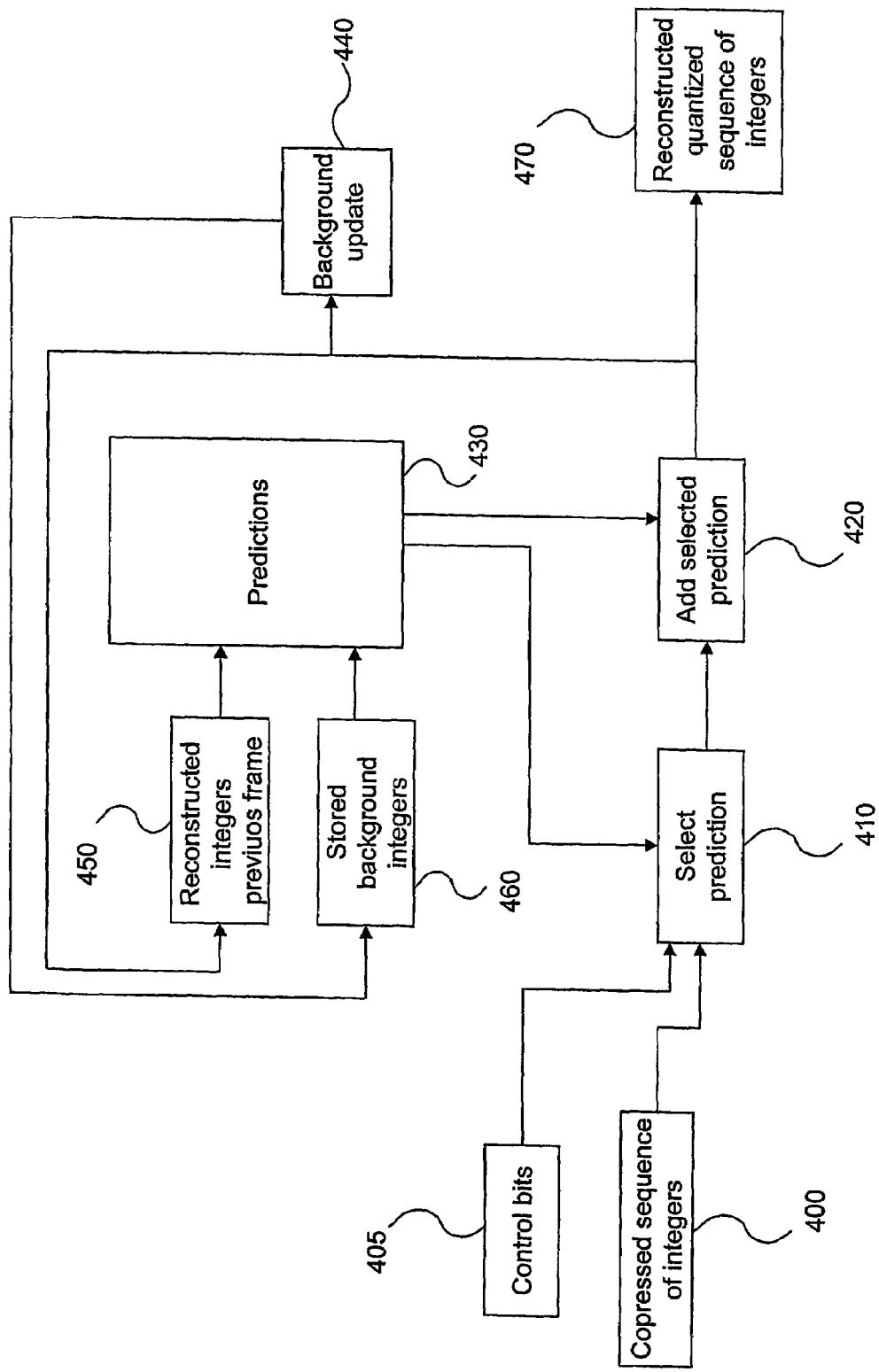
FIG. 5 is a flow chart illustrating steps for performing the operation of the inverse adaptive quantization block of the decompression part shown in FIG. 3.

Thereafter, the decoded sequence of integers is sent to the inverse adaptive quantization block 250 where the sequence is processed using an inverse adaptive quantization in order to obtain a reconstructed sequence of integers for each frame. This reconstructed sequence corresponds to the sequence of integers obtained after the quantization in block 140. The function of this block will be explained in detail in connection to FIG. 5. The output from the inverse adaptive quantization block 250 is transferred to the inverse quantization block 260, where the reconstructed sequence of each frame is inversely quantized using the threshold value according to known methods. The function and realization of the quantization block is well known to a person skilled in the art, and therefore it will not be explained here further, see, for example, "Fast adaptive wavelet packet image compression", IEEE Transactions on image processing, 9, pp 792-800, Meyer, Francois G., Averbuch, Amir Z., and Jan-Olof Strömberg, "A video compression standard for multimedia applications", Communications of the ACm, 34 (1991('), pp 46-58, Le Gall, Didier or "Low bite-rate efficient compression for seismic data", IEEE Transactions on image processing, 10 (2001), Meyer, Francois G., Averbuch, Amir Z., Jan-Olof Strömberg, Cofman R., and Vassiliou, A.

Next, the inversely quantized sequence is send to the inverse transform block 230 where the sequence is inversely transformed using an inverse entropy increasing transform method, for example, an inverse wavelet transform. Thereby, a reconstructed sequence of real number is obtained corresponding to the sequence of real numbers outputted from the transform block 120. The functions and realization of the inverse transform block and is well known to a person skilled in the art, and therefore it will not be explained here further, see, for example, "Fast adaptive wavelet packet image compression", IEEE Transactions on image processing, 9, pp 792-800, Meyer, Francois G., Averbuch, Amir Z., and Jan-Olof Strömberg, "A video compression standard for multimedia applications", Communications of the ACm, 34 (1991('), pp 46-58, Le Gall, Didier or "Low bite-rate efficient compression for seismic data", IEEE Transactions on image processing, 10 (2001), Meyer, Francois G., Averbuch, Amir Z., Jan-Olof Strömberg, Cofman R., and Vassiliou, A.

Then, the sequence of real number is converted to an image format that can be reproduced by the display unit in the data converter, i.e. the reconstructed bit map data.

The method for compression and decompression in accordance with the present invention is preferably performed in real time (25 frames/second) for 24 bit colour video of a size of 352×240. The method according to the invention can easily be implemented in, for example, current hardware, such as a computer or the like. For example, the method can be implemented a computer program. Generally, using a frame size of 288×360, approximately 100 bytes/frame are transferred when no motions occur. Medium medium-sized motions may require 300-400 bytes/frame and large motions may require up to 1000 bytes/frame.

Using the method according to present invention in the GSM network, a transmission rate of 19200 b/s is possible, which with 6 frames/second correspond to 400 bytes/frame. Accordingly, if a time-shift of a few seconds is allowed in the transmission, 400 bytes/frame can be allowed in average. If the motion activity is low, each frame will require well below 100 bytes at the display size of a cellular phone. If the motion activity increases, the quality of the image can be reduced in order to compensate for the increased amount of bytes/frame required.

Figure 4:
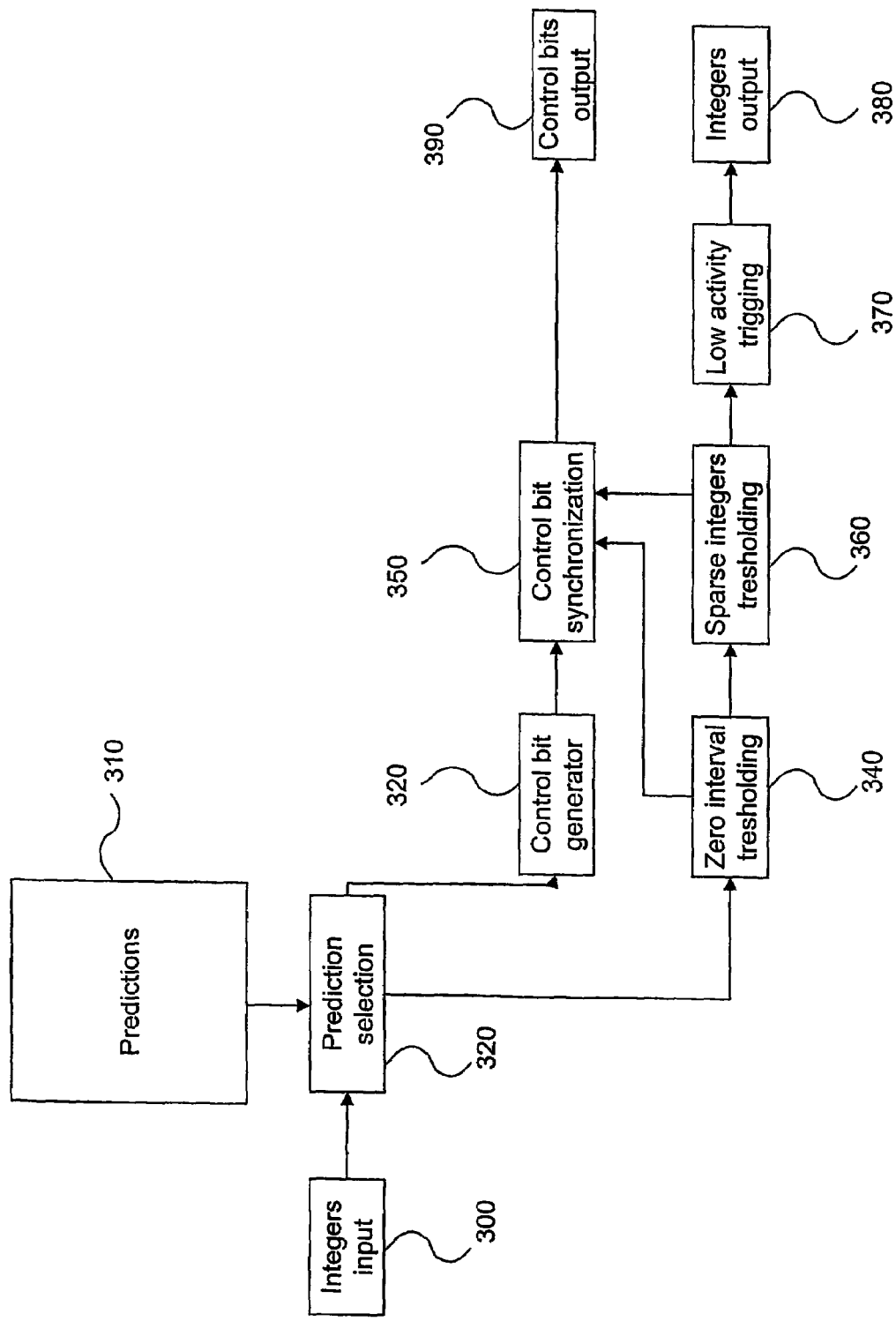
FIG. 4 is flow chart illustrating steps for performing the operations of the adaptive quantization block of the compression part shown in FIG. 2.

With reference now to FIG. 4, the operations of the adaptive quantization block will be explained by means of a flow chart. For video sequences where the camera or recording unit is immobile or stationary or having an in-built stabilisation unit during the recording period, the coefficients of an image or frame often may be predicted very well by the corresponding coefficients of the previous image. Accordingly, if no changes have occurred between two consecutive images, the corresponding coefficients of the two images will be identical. To elaborate, if no movements or motions have occurred, the difference between the corresponding coefficients of the two consecutive images will be zero or at least very small since there is always a certain amount of noise present, which may cause small differences. In general, for example, when using surveillance cameras to monitor an area, for example, a storeroom, a factory, an office and the like, a major part of the coefficients are unchanged between two consecutive frames since the surveillance often is performed during night-time where the motion activity of such areas, most of the time, is insignificant.

In operation, a sequence of integers of the current frame is inputted 300 to the block 150. In a block 310, a predicted sequence of integers is determined and stored. This predicted sequence can, for example, be the corresponding integers of sequence the previous image. In fact, in case it is the corresponding integers of sequence the previous image, it is a simulated reconstructed sequence of integers of the previous frame. For example, this simulation can be implemented by integrating a decoding block similar to the decoding block 240 in the block 150. This decoding block processes the incoming bit stream of a frame in a similar way as the decoding block 240 will process the received bit stream representing the frame and will, accordingly, obtain the exactly same sequence of decoded integers as the decoding block 240.

Furthermore, if a background/reference frame is used, a reference sequence representing this frame is also stored in this block.

Then, in block 320, each coefficient of the predicted sequence is compared with the corresponding coefficient or integer of the current sequence and, if necessary, the corresponding coefficient of the reference sequence according to the following:

$$c'=c-r \text{ if } p=r \text{ or } c-r/p-r<\frac{1}{2} \quad (1)$$

$$c'=c-p \text{ otherwise,}$$

where c is a coefficient or an integer of the sequence of the current frame, r is the corresponding reference coefficient of the reference frame and p is the corresponding predicted coefficient. If the reference frame is a black image the reference coefficient will be 0. Subsequently, a selection process is performed where the code length of each coefficient c' is estimated and the coefficient resulting in the shortest code is selected for each position in a resulting sequence. To this end, an evaluation value is determined for each coefficient c' and, in this embodiment, the absolute value is determined for each coefficient c' and the coefficient c' having the minimum absolute value is selected for a difference sequence.

It is necessary to provide the reconstruction algorithm or the reconstruction block 220 with information regarding the selection of the c' coefficient and for each coefficient the reconstruction block has access to the predicted value that has been calculated from the previously reconstructed quantized integers held or stored in the prediction block 430 (se FIG. 5), except in the case where:

$$p \neq r \text{ and } -\frac{1}{2} \leq \frac{c-r}{p-r} < \frac{3}{2}. \quad (2)$$

In such cases the reconstruction block 220 has to be notified or informed whether the coefficient of the current sequence or the difference between the current coefficient and the predicted coefficient has been selected. For this purpose, in block 330, a control bit is generated containing information of the selection in block 320. Thereby, the reconstruction or decompression block 220 is able to identify which relation between the integer of the sequence of the current frame, the corresponding reference coefficient of the reference frame and the corresponding predicted coefficient that has been selected.

The control bits are in fact a series of integers, ones or zeros, and will be compressed in the same manner as the difference sequence, with the exception that no sign bits indicating the sign of the integer are necessary. Since only ones and zero are included in the control bits, the encoding of the control bits used is a run-length encoding.

The prediction selection that occurs in the block 150 is based on certain rules, for example, the above-mentioned rules expressed by the relations (1) and (2). As indicated above, the reconstruction block do not have information regarding the selection but the rules or the relations regulating the selection process.

Then, in block 340, small variations in the coefficients in the difference sequence caused by noise included in the data representing an image or frame, which thus manifests in small variations in the coefficients, are coded. The noise is created by, inter alia, small changes in the light conditions and signal noise from the camera. If the following expression is satisfied $$|\text{differences}|<T_1 \quad (3)$$

where differences is the coefficients of the difference sequence and $T_1$ is threshold value the coefficient is set to zero. The threshold value is preferably equal to one, but other integers are possible, for example 2, 3, 4, or 5. If the coefficients in the difference sequence, i.e. the difference between the predicted value and the present value, is less than $T_1$, it is presumed that the prediction is the preceding frame. Thus, this entails that a control bit is not necessary and in order to keep the control bit sequence synchronized it is important not to send the control bit associated with the present coefficient, which is performed in block 350. By performing tests with the camera used in the system a suitable $T_1$ can be selected. If the camera produces a large amount of noise, $T_1$ can be set to a higher value. Likewise, if light conditions with a varying brightness is expected. The disadvantage with setting $T_1$ to a high value is that lags may occur, which can be manifested as a "shadow" after objects moving in the image or frame. Preferably, $T_1$ is set to 2 or 3.

Thereafter, in block 360, a byte amount limitation is performed at the sequence. To this end, a threshold value $T_2$ is used, and preferably:

$$T_2 \geq 1. \quad (4)$$

If $T_2=1$ no limitation will occur, and if $T_2>1$ the code outputted from the coder will be abridged. A higher $T_2$ value involves a shorter code. In practice the limitation procedure works as follows. Lets assume that d is a integer of the difference sequence, uid its bit representation (as a positive integer), $uiT_2$ the bit representation of $T_2$ (as a positive integer), and ui1.0 is the bit representation of the float 1.0 (as a positive integer). For example, if the binary value of ui1.0 is 00111111100000000000000000000000 and $d \geq T_2$, d will replaced with $d_1$ rounded down to an integer, where $$uid1 = uid - (uiT_2 - ui1.0). \quad (5)$$

uid1 as a bit stream represents a float number near d. This float number is rounded down to the nearest integer, d1. Consequently, d1 will be an integer close to d.

If $d \leq -T_2$ the corresponding will occur using $-d$ instead, and the sign is changed to a negative integer. If $|d| \leq T_2$, d is replaced with zero.

The result of this procedure is that the amount of integers is decreased, i.e. the integers becomes more sparse, the bigger $T_2$ is. The selection of the threshold value $T_2$ can be performed automatically where an upper limit of the amount of byte for each frame is set.

In practice, this step 360 is performed in the encoding block 160. In principle, the method is performed according to the following. An earlier threshold value is selected. Then, the coding is simulated in a manner that the number of coded bits can be counted, for example, the bit-stream is not calculated and counted. It is assumed that the number of bits decreases with an increasing threshold value. In step 1, the threshold values are increased (or decreased) with a factor of 2 stepwise until a threshold value that provides a smaller number of bits than what demanded and that half of the threshold value provides more bits than what demanded.

By using these threshold values and the corresponding number of bits, a new threshold value is interpolated in step 2, which new value corresponds to the demanded number of bits. Thereafter, in step 3, the number of bits of the new threshold value are calculated, which may be larger, smaller or equal to the demanded number. In step 4, by using these threshold values and the corresponding number of bits, a further threshold value is interpolated. Steps 3 and 4 are repeated until the calculated number of bits of one threshold value is within a preset tolerance margin of demanded number of bits or until that a preset maximal number of iterations has been performed.

Thus, in block 350, the control bits are synchronized in order to send only necessary control bits. As mentioned above, certain control bits may become unnecessary as a result from the processing in block 340.

Optionally, a low activity trigging block 370 may be used. If the motion activity of the video scene is very low, i.e. the area that the recorder monitors, a byte equal to zero can be send for each such low motion frame. This can be utilized for instance to turn off the transmission when using a cellular phone as modem, and when the motion activity in the monitored area increases, the phone is connected and the transmission is resumed. This can be realized by placing a parameter having the shortest length in the byte length of the code representing a frame. If the code that is produced by the coding block 160 do not exceed the length of the parameter, the code is not be sent and the predictions are not updated. This means that fixed predictions are used until that a sufficient amount of bytes is achieved. In other words, the coder is "sleeping", but it constantly processes incoming data. Finally, the quantized sequence of integers 380 and associated control bits 390 are outputted to the encoding block 160 and, then, further to a recipient via the communication network With reference now to FIG. 5, the operations of the inverse quantization block 250 will be explained by means of a flow chart. As indicated by 400 the decoded sequence of integers (for each frame), i.e. the compressed sequence of integers, and, if any, associated control bits 405 are inputted to the block 250 from, for instance the storage of the computer unit 100 or at receipt via the communication network 180.

In operation, in block 410, a prediction is selected. That is, if p=0 or c/p<½, a coefficient of the decoded sequence c' is replaced by c−r, if the reference frame is a black image the reference coefficient, r, will be 0, and, otherwise, c' is replaced by c−p. The control bits is, as indicated above, necessary when the relation (2) applies, i.e. the following applies $$p \neq r \text{ and } -\frac{1}{2} \leq \frac{c-r}{p-r} < \frac{3}{2}$$

In such cases, as mentioned above, the reconstruction block 220 has to be notified whether the coefficient of the current sequence or the difference between the current coefficient and the predicted coefficient has been selected, which, accordingly, is fulfilled by the control bits.

The prediction selection that occurs in the block 150 is based on certain rules, for example, the above-mentioned rules expressed by the relations (1) and (2). As further indicated above, the reconstruction block do not have information regarding the selection but the rules or the relations regulating the selection process. However, for each prediction and the received difference, i.e. the compressed sequence of integers, the block 220 can examines what the integer of the current sequence would be and if the selection of the prediction is consistent with the predetermined set of rules, e.g. the relations (1) and (2) are used. For this purpose there are three possibilities:

1. There are several consistent selections of prediction, in which case further information is required in form of control bits.
2. There is only one consistent selection of prediction, in which case no further information is required.
3. There is no consistent selection of prediction. This alternative is not supposed to occur if the block 150 follows the implemented set of rules.

In the embodiment described above, the first alternative is present when the relation (2) applies. All data required in the block 410 is retrieved from a prediction block 430.

Thereafter, in block 420, the coefficients of the decoded sequence is replaced according to $$c = c' + r \text{ if } p = r \text{ or } \frac{c-r}{p-r} < \frac{1}{2}, \qquad (6)$$
$$c = c' + r \text{ otherwise}$$

where c' is an integer of the compressed sequence, r is the corresponding integer of the reference frame, and c is the corresponding integer of the reconstructed sequence representing the first sequence of the current frame. Thereby, a reconstructed sequence of integers is obtained, which corresponds exactly, or approximately, to the sequence inputted to the compression block 130. This reconstructed sequence information is also fed-back 450 to the prediction block 430, where, inter alia, the prediction of the last frame and, if any, a reference frame, i.e. a background prediction, are stored. Accordingly, all data required in blocks 410 and 420 are retrieved from the block 430.

If a background prediction is used, a background update is performed in block 440 according to the following. A parameter N is set. If the reconstructed quantified integer value, a, of a coefficient of the current frame is not equal to the corresponding value of the background/reference frame, and if a has not changed in the last N frames, the background, or in fact the background sequence, is updated with a and transferred 460 to block 430.

Finally, the reconstructed quantized sequence of integers is outputted 470 to the inverse transform block 230.

The general principle for the handling of predictions in the adaptive quantization block 150 and the inverse adaptive quantization block 250 will be discussed hereinafter.

A prediction may be for a full frame of coefficients (QI) or for a subset of the frame. One may have several predictions at the same time. This means that there may be a different number of predictions for the individual coefficients. The predictions for different coefficients are handled separately, except in some cases when there is no optimal choice of prediction. In these cases, the extra information, i.e. the control bits, that has to be transferred should be minimized. For any fixed coefficient $c_i$ we have a set of predictions. That is, a set of predicted integer values $\{p_i^k\}_k$.

The predictions that are close to each other will first be bunched together. This procedure is controlled by an integer parameter $T_0 > 0$. Then a subset of predictions $\{p_i^k\}_s \subset \{p_i^k\}_k$ is identified such that $$|p_i^s - p_i^{s'}| \geq T_0 \text{ for } s \neq s' \tag{7}$$

and that for each prediction $p_i^k$ there is a prediction $p_i^s$ in the subset such that $$|p_i^k - p_i^s| < T_0 \tag{8}$$

This subset of prediction is ordered as an ordered set of integers $$p_i^1 < p_i^2 < \ldots p_i^n \tag{9}$$

where the number $n = n(i)$ may differ from coefficient to coefficient.

Thereafter the a primary selection of prediction values is performed. If $c_i$ is the coefficient that is coded the prediction $p_i^s$ is used, which will minimize the expression $|c_i - p_i^s|$. It is a unique prediction that minimize this expression except in the case when the coefficient value $c_i$ is exactly in middle of two predictions in which case $|c_i - p_i^s| = |c_1 - p_i^{s+1}|$. In this case the selection between the prediction $p_i^s$ and $p_i^{s+1}$ is done in a secondary selection that will be described hereinafter.

The lossless ATQI value (Adaptive quantized integer) is $d^i = c_1 - p_i^{su}$ where $p_i^{si}$ is the selected prediction value for the coefficients $c_i$. It is possible to exactly reconstruct the value $c_i$ from the ATQI integer $d_i$ provided that the predictions are known and its known prediction that was chosen.

The ADQI value $\tilde{d}_i$ may be equal to the value $d_i$ above but it may instead be an approximation of the value. This is controlled by two parameters $T_1$ and $T_2$ which are incorporated in order to control an upper limit of the bitstream from the coder. When $|d_i| < T_1$ we set $\tilde{d}_i = 0$. Then is further quantization is performed so that $\tilde{d}_i \in Z_{T_2}$ where $Z_{T_2}$ is the set of all integers. The approximation is done such that $0 \leq \tilde{d}_i / d_i$ when $d_i \neq 0$. With the ATQI value $\tilde{d}_i$ we can reconstruct an approximate value $\bar{c}_i$ of the coefficient value $c_i$ provided the selection of the prediction is known.

$$\tilde{c}_i = \tilde{d}_i + p_i^{si} \tag{10}$$

Once the value $\tilde{d}_i$ and the set of predictions $p_i^1 < p_i^2 < \ldots p_i^n$ are known some of the predictions may be excluded as non-admissible predictions since they will lead to a contradiction to the primary selection rule:

$$s < n(i) \text{ and } p_i^{s+1} < p_i^s + 2\tilde{d}_i \tag{11}$$

This implies that $p_i^s$ can not be a possible selected prediction. Assume that $p_i^s$ is the selected prediction then $$c_i \geq p_i^s + \tilde{d}_i \tag{12}$$

and thus $$|c_i - p_p^{s+1}| < \tilde{d}_i \leq d_i = |c_i - p_i^s| \tag{13}$$

which means that the prediction $p_i^s$ does not give the minimum value and therefore not should have been selected according to the primary selection rule described above. In the case that $\tilde{d}_i < 0$ a prediction $p_i^s$ is non-admissible if $$s > 1 \text{ and } p_i^{s-1} > p_i^s + 2\tilde{d}_i \tag{14}$$

Again, this implies that the $p_i^s$ can not be one of the possible selected predictions.

Once the list of predictions $\{p_i^s\}_s$ and the ATQI value di are known, the number ad(i) of admissible predictions can be found. The number ad(i) will be calculated both in the adaptive quantization block 150 and the inverse adaptive quantization block 250.

The information of the selection of predictions is an information about the selections which informs each coefficient (indexed with i) which one of the ad(i) admissible predictions that were used. This is done, for example, by iterative run-length coding, similar to the run-length coding of the coefficient values, where the coefficients are splitted up in groups according to in which dyadic interval the coefficients have their values. When coding the I information of which of the admissible predictions that were selected, the function ad(i) limits the number of possible selections for each coefficient.

Let s(i) be the index for which prediction that was selected for coefficient $c_i$, then $1 \leq s(i) \leq ad(i)$ let $S_k = \{I, s(i) = k\}$. Then $\{S_k\}_{k \geq 1}$ is a collections of a disjoint set of index for the coefficients of the frame so that their union is the set S of index of all coefficients. The control bits has to transmit the information of all these sets $S_k$ as subsets of S. Let $$D_k \bigcup_{l \geq k} S_l \tag{15}$$

and $$E_k = \{i \in D_k \text{ such that } a(i) > k\} \tag{16}$$

and $$F_k = D_k \backslash E_k \tag{17}$$

An induction over $k \leq 1$ starting with $k=1$ is not necessary. We have $$D_1 = S \tag{18}$$

and for $k = 1, 2, 3, \ldots$ we have $$F_k = \{i \in D_k \text{ such that } a(i) = k\} \tag{19}$$

$$E_k = D_k \backslash F_k \tag{20}$$

and run-length coding is used to find $D_{k+1}$ as a subset of $E_k$.

This is continued for increasing integers k to obtain $D_{k+1}$ as a subset of $D_k$ as long as $D_k$ is not the empty set.

Finally, $$S_k = D_{k+1} \backslash D_k \tag{21}$$

is obtained.

In the case there are two optimal choices of best predictions $p_i^s$ and $p_i^{s+1}$ a secondary selection is performed between these two predictions. In this secondary selection the run-length used in the iterative run-length coding described above is minimized. The strategy is to obtain as long sequences as possible with the same bit (0 or 1). By doing this a prediction index as close as possible to that of the preceding coefficients is obtained. That is $$s(i)=\{t \in \{s, s+1\} \text{ that minimize } |t-s(i-1)|\}.$$

According to an alternative embodiment of the method according to the present invention, motion prediction blocks can be included in order to improve the quality of the compressed and decompressed data when, for example, the degree of correlation is reduced due to vibrations of the recording unit or when objects are moving in the recording space, i.e. a car driving through the video scene.

According to the above described embodiment, a so called autonomic prediction is actually used. It is based on that exactly the same algorithm is used on the compression side and the decompression side. This algorithm is determistic, i.e. no stochastic processes are involved, so that the outcome of the predictions on the adaptive quantization side, i.e. the output of the adaptive quantization block 150, and inverse adaptive quantization side, i.e. the output of the inverse adaptive quantization block 250, will be identical. Accordingly, no prediction information need to be transmitted, except that the decompression block has to know which algorithm that is used. Note that the autonomic prediction algorithm is not allowed to use any information from the current frame which is about to be compressed.

One example of autonomic prediction is the zero prediction: all coefficient values are predicted to zero. Another example is the last frame prediction: the predicted coefficients are set to the reconstructed quantized integers of the last frame.

With reference now to FIGS. 6a and 6b, an alternative embodiment including motion prediction blocks is shown. A first parameter controlled prediction block 610 and a prediction parameter estimation block 620 are included in the compression processing block 130 at the adaptive quantization block 150, see FIG. 6a, and a second parameter controlled prediction block 630 is included in the decompression block 220 at the inverse adaptive quantization block 250. The prediction consists of two steps. Firstly, parameter that are to be used in the second step are estimated in block 620. Any information based on history of the preceding frames may be used as well as information from the current frame, i.e. the quantized integers as indicated by 680. Once the parameters have been estimated they are sent (indicated by 640), together with the control bits (indicated by 650), to the inverse adaptive quantization block 250. The second step is an algorithm that runs parallel in the first and second parameter controlled prediction block 610 and 630, respectively, using the estimated parameters 640 and the outputs of 660 the adaptive quantization block 150 and the output 670 of the inverse adaptive quantization block 250, respectively. No information is used from the current frame except the information given by the estimated parameters 640. One example of parameter controlled prediction is the global translation prediction. The current frame is matched to the last frame by translating the last frame and obtain the translation parameter describing the translation which gives the best matching. Then, the last frame is reconstructed from the last set of reconstructed quantized integers, the image or frame is translated and a new set of quantized integers of the translated image are constructed. This new set of quantized integers of the translated last frame is then used as prediction values.

In this embodiment, one of the algorithms implemented in the first or second parameter controlled prediction block 610, 630 must have knowledge of the geometric ordering of the quantized integers and the wavelet algorithms which was used in the pre-processing in order to do these backward transformations to an image and then—after finding the best translation—to do the calculation of the new quantized integers.

With this global translation prediction a better compression of, for example, a video sequence taken by handheld (non-stabilized) camera.

Using the global translation prediction in conjunction with the autonomic prediction provides an effective way of coding a moving object on a fixed background—provided that the translation parameter value corresponding to the motion of the object from the last frame to the current frame. Information regarding the shape of the object is not required.

A global affine transformation can also be included—this would handle video sequences with rotations and zooming.

Local autonomic translation predictions can also be used—where the translation parameters are based on estimates from matching reconstructed images from the last set of reconstructed quantized integers and earlier sets of reconstructed quantized integers. It is local in the sense that the frame can be divided in local boxes for which the parameters are estimated individually, and then the anticipated translation is extrapolated. Note that there may be a number of local translation parameters, but they are generated on each side, i.e. in the adaptive quantization block or the inverse adaptive quantization block, separately.

The matching computation can be performed according to the following. Assume that the image is matrix, where f is the current matrix, g the matrix to be matched with and $x_B$ is an index function for the local box B. The expression:

$$m(y)=\int |f(x)-g(x-y)|^2 \chi_B(x) dx \qquad (22)$$

where x are coefficients of the current frame and y are coefficients of the last frame, is minimized. This can be done by calculating:

$$\int |f(x)|^2 \chi_B(x) dx \qquad (23)$$

and the convolutions $(f\chi_B)*\tilde{g}(y)$ and $(\chi_B)*|\tilde{g}|^2(y)$, where $\tilde{g}(x)=g(-x)$. The convolutions are performed as multiplication on the Fourier transform side. Using the Fast Fourier transform algorithm the calculation can be done in order of $N*\log(N)$ steps, where N is the number of elements in the matrix. This matching procedure is well known for the person skilled in the art.

In order to deal with the problem of flickering light conditions, an average data value can be calculated for the current frame. This is a pre-process conducted before the quantized integers are obtained. In the case with wavelets coefficients, this can easily be performed using methods known to the man skilled within the art. Then a multiplicative calibration is performed by modifying the threshold before the quantization. According to an alternative method for dealing with the problem of flickering light conditions, a global translation can be performed with a multiplicative factor. The expression $$m(y, a)=\int |f(x)-ag(x-y)|^2 dx \qquad (24)$$

where f is the current frame, g the last frame, x coefficients of the current frame and y coefficients of the last frame, over the translation vectors y and the multiplicative factors a. The maximum is obtained when a=amin(y).

$$a_{\min}(y) = \frac{f * \tilde{g}(y)}{\int |\tilde{g}|^2 dx} \qquad (25)$$

where $\tilde{g}(x)=g(-x)$. Inserting $a=a_{min}(y)$ in (24) gives $$m(y, a_{\min}(y)) = \int |f(x)|^2 - \frac{|f*\tilde{g}(y)|^2}{\int |\tilde{g}|^2 dx}. \qquad (26)$$

Finally, the expression $m(y, a_{min}(y))$ over the translation vectors y.

Although specific embodiments have been shown and described herein for purposes of illustration and exemplification, it is understood by those of ordinary skill in the art that the specific embodiments shown and described may be substituted for a wide variety of alternative and/or equivalent implementations without departing from the scope of the invention. Those of ordinary skill in the art will readily appreciate that the present invention could be implemented in a wide variety of embodiments, including hardware and software implementations, or combinations thereof. As an example, many of the functions described above may be obtained and carried out by suitable software comprised in a micro-chip or the like data carrier. This application is intended to cover any adaptations or variations of the preferred embodiments discussed herein. Consequently, the present invention is defined by the wording of the appended claims and equivalents thereof.

The invention claimed is:

1. Method for compressing data, comprising the steps of:
    transforming data of a frame into a first sequence of real numbers by using an entropy increasing transform method;
    quantizing said first sequence of real numbers of said frame to obtain a first sequence of integers;
    quantizing said first sequence of integers of said frame using a predicted sequence of integers representing said first sequence of integers to produce a second sequence of integers; and
    encoding said integers of said second sequence of said frame into a stream of bits representing a compressed sequence of integers of said frame.

2. Method according to claim 1, wherein quantizing said first sequence of integers of said frame comprises the step of:
    for each coefficient of said second sequence of integers, selecting a relation between an integer of said first sequence of integers of said frame and the corresponding integer of a reference frame and the corresponding integer of the predicted sequence based on an evaluation value of said relation.

3. Method according to claim 2, wherein the step of selecting comprises the step of
    for each coefficient of said second sequence of integers, comparing a first relation between the integer of said first sequence of integers of said frame and the corresponding integer of a reference frame and a second relation between said integer and the corresponding integer of the predicted sequence; and
    determining the evaluation value for each relation based on respective relation in encoded form.

4. Method according to claim 2, further comprises the step of
    determining an absolute value of respective relation, wherein the evaluation value for each relation is set to the corresponding absolute value.

5. Method according to claim 4, wherein the step of selecting comprises the step of selecting the relation having a lowest absolute value.

6. Method according to claim 2 or 3, wherein the step of selecting comprises the step of:
    selecting said relation according to, $$c' = c - r \text{ if } p = r \text{ or } \frac{c-r}{p-r} < \frac{1}{2},$$
$$c' = c - p \text{ otherwise}$$

where c' is an integer of the second sequence, p is the corresponding integer of the predicted sequence, c is the corresponding integer of the first sequence of a current frame, and r is the corresponding integer of a reference frame.

7. Method according to claim 4, wherein the step of quantizing said first sequence of integers of said frame further comprises the step of: if $$p \neq r \text{ and } -\frac{1}{2} \leq \frac{c-r}{p-r} < \frac{3}{2},$$

associating a control bit identifying the selected relation.

8. Method according to any one of claims 1-5 and 7, further comprising the step of:
    storing said stream of bits as a compressed representation of said sequence of said frame.

9. Method according to any one of the claims 1-5 and 7, further comprising decompressing said compressed sequence by inverting the steps of transforming, quantizing said first sequence of real numbers, quantizing said first sequence of integers of said frame, and decoding in reverse order.

10. Method according to claim 9, wherein the step of inverting the step of quantizing said first sequence of integers comprises the steps of:
    reconstructing a sequence of integers of a current frame according to, $$c = c' + r \text{ if } p = r \text{ or } \frac{c-r}{p-r} < \frac{1}{2},$$
$$c = c' + r \text{ otherwise}$$

where c' is an integer of the compressed sequence, r is the corresponding integer of the reference frame, and c is the corresponding integer of the reconstructed sequence representing the first sequence of the current frame.

11. Method according to claim 10, wherein the step of reconstructing comprises the step of
    if $$\text{if } p \neq r \text{ and } -\frac{1}{2} \leq \frac{c-r}{p-r} < \frac{3}{2},$$

where p an integer of the predicted sequence and c is the corresponding integer of the current frame, using the associated control bit to identify the relation between an integer, c', of the compressed sequence, the corresponding integer, r, of the reference frame, and the corresponding integer, c, of the reconstructed sequence representing the first sequence of the current frame.

12. Method according to claim 10, further comprising the step of
storing the reconstructed sequence of integers.

13. Method according to any one of claims 1-5 and 7, wherein the predicted sequence is a simulated reconstructed sequence of a previous frame.

14. Method according to any one of the claims 1-5 and 7, wherein the entropy increasing transform method is a wavelet transform method.

15. System for compressing and decompressing data, comprising:
a storage device for storing data;
transform means arranged to transform a frame of data into a first sequence of real numbers;
compression processing means, comprising
quantization means arranged to quantize said first sequence of real numbers to produce a first sequence of integers;
adaptive quantization means arranged to quantize said first sequence of integers to produce a second sequence of integers by using a predicted sequence of integers representing said first sequence of integers; and
encoding means arranged to encode said integers of said second sequence of said frame into a stream of bits representing the compressed sequence of integers of said frame.

16. System according to claim 15, farther comprising
reconstruction means comprising
decoding means arranged to decode a bit stream representing a compressed sequence of integers into a third sequence of integers;
inverse adaptive quantization means arranged to inversely quantize said fourth sequence of integers to produce a reconstructed first sequence of integers by using the predicted sequence of integers representing said first sequence of integers; and
inverse quantization means arranged to inversely quantize said reconstructed first sequence of integers to produce a second sequence of integers second sequence of real numbers; and
inverse transform means arranged to inversely transform said sequence of real number to a reconstructed frame of data.

17. Computer readable medium comprising instructions for bringing a computer to perform the method according to any one of the claims 1-5 and 7.

* * * * *